United States Patent [19]
Raab

[11] Patent Number: 5,408,754
[45] Date of Patent: Apr. 25, 1995

[54] METHOD AND APPARATUS FOR MEASURING SLEEPING POSITIONS

[75] Inventor: Simon Raab, Longwood, Fla.

[73] Assignee: Faro Technologies, Inc., Lake Mary, Fla.

[21] Appl. No.: 142,661

[22] Filed: Oct. 26, 1993

Related U.S. Application Data

[63] Continuation-in-part of Ser. No. 21,949, Feb. 23, 1993.

[51] Int. Cl.6 .......................... A61B 5/103; G01B 5/03
[52] U.S. Cl. ........................................ 33/503; 33/512; 33/701; 364/413.02; 128/774; 5/464
[58] Field of Search ................ 33/701, 511, 512, 515, 33/504, 503; 364/413.02; 128/774, 781, 782; 5/464

[56] References Cited

U.S. PATENT DOCUMENTS

| | | | |
|---|---|---|---|
| 1,359,801 | 11/1920 | Goldner | 5/464 |
| 2,545,310 | 3/1951 | Rosberger | 5/464 |
| 2,853,721 | 9/1958 | Koenigsberg | 5/464 |
| 3,083,380 | 4/1963 | Adler | 5/464 |
| 3,890,958 | 6/1975 | Fister et al. | |
| 4,135,498 | 1/1979 | McGee | |
| 4,320,766 | 3/1982 | Alihanka et al. | 128/782 |
| 4,425,713 | 1/1984 | Rotella | |
| 4,670,851 | 6/1987 | Murakami et al. | |
| 4,676,002 | 6/1987 | Slocum | |
| 4,679,331 | 7/1987 | Koontz | |
| 4,760,851 | 8/1988 | Fraser et al. | 128/774 |
| 4,819,195 | 4/1989 | Bell et al. | |
| 4,888,877 | 12/1989 | Enderle et al. | |
| 4,891,889 | 1/1990 | Tomelleri | |
| 4,942,545 | 7/1990 | Sapia | |
| 4,982,504 | 1/1991 | Soderberg et al. | |
| 5,148,706 | 9/1992 | Masuda et al. | 128/774 |
| 5,187,874 | 2/1993 | Takahashi et al. | |
| 5,230,623 | 7/1993 | Guthrie | 128/774 |
| 5,251,127 | 10/1993 | Raab | 364/413.13 |

Primary Examiner—Christopher W. Fulton
Attorney, Agent, or Firm—Fishman, Dionne & Cantor

[57] ABSTRACT

A method for measuring sleeping positions using a portable coordinate measuring machine is presented. The measured sleeping position information can be used to select or design a mattress which will result in a preferred sleeping position, whereby stresses on the individual's back and other muscles are minimized. The portable coordinate measuring machine comprising a multijointed manually positionable measuring arm for accurately and easily measuring a plurality of points or landmarks of an individual.

17 Claims, 12 Drawing Sheets

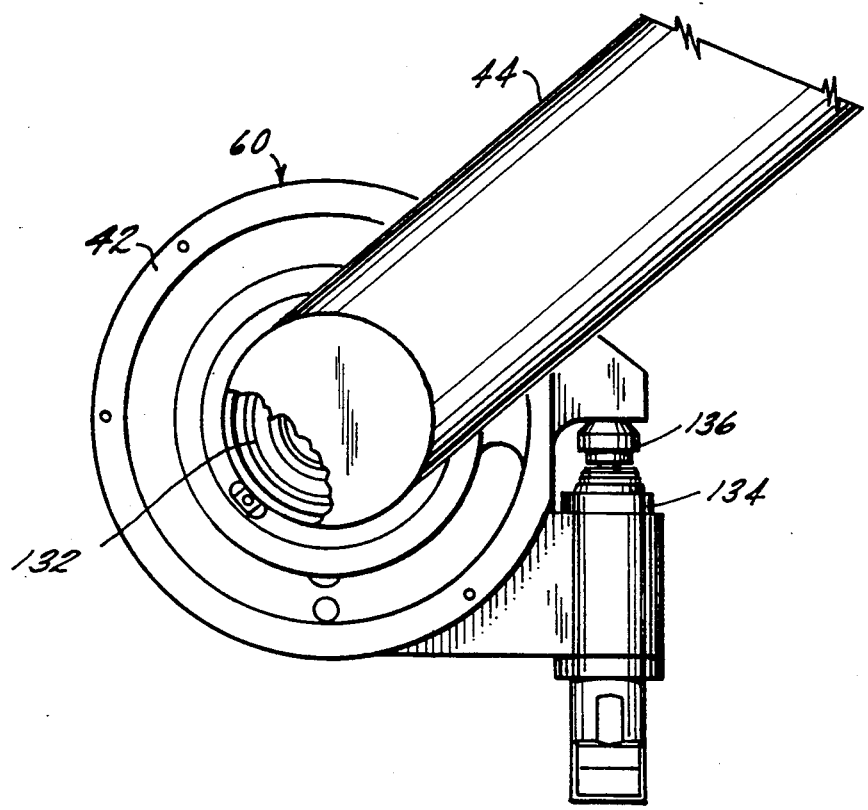
FIG. 8
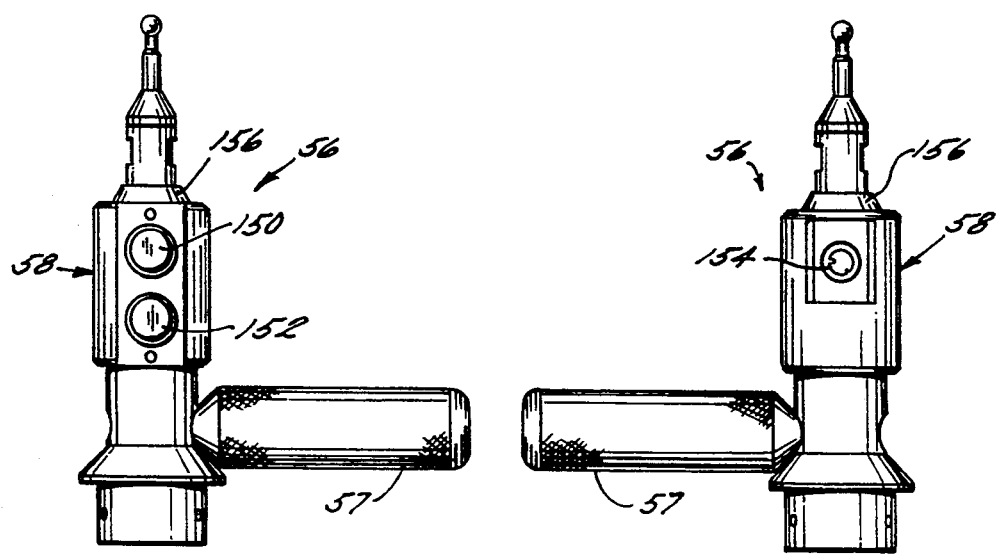
FIG. 9A
FIG. 9B

METHOD AND APPARATUS FOR MEASURING SLEEPING POSITIONS

This is a continuation-in-part of copending U.S. application Ser. No. 08/021,949 filed Feb. 23, 1993.

BACKGROUND OF THE INVENTION

This invention relates generally to a method and apparatus for measuring sleeping positions of an individual. More specifically, the present invention relates to a method and apparatus for measuring sleeping positions of an individual using a coordinate measuring machines (or CMM's).

Devices for measuring an individual are known.

U.S. Pat. No. 4,425,713 discloses a postureometer instrument for measuring, in inches and degrees, posture deviations of a human body in an upright position. This device includes a base with a calibrated post, having a multiple number of adjustable pins for contact with the spinal column. It further includes a pair of elevatable yokes on the post, which are calibrated in degrees of angle, and include spaced arms having calibrated and adjustable pins for measuring various posture deviations.

U.S. Pat. No. 4,135,498 discloses a device for making physical measurements with respect to the body of a patient. The device includes a non-opaque sheet-form viewing screen mounted on a frame. The screen includes centrally located, vertically extending graduations and a graduated, horizontally extending measuring bar mounted for vertical movement relative to the vertical graduations on the screen. A rotatable angle measuring arm and an associated indicator plane is mounted for movement along the measuring bar. An x-ray light box is pivoted for movement into and out of an operative position behind the screen.

U.S. Pat. No. 3,890,958 discloses a physiological diagnostic apparatus for determining the location of, and shifts in, the center of gravity of the human body. The apparatus incorporating a body support member engaged upon a base assembly for pivoting about a transverse axis, a load responsive device located beneath the body support member in a portion thereof remote from its pivot axis, a processor for receiving signals from the load responsive device, and a readout instrument for accepting the output from the processor for display of the center of gravity behavior.

U.S. Pat. No. 4,760,851 discloses a method of performing 3-dimensional skeletal analysis on a patient. The apparatus for performing the analysis includes a digitizer, the digitizer being adapted to accept either a scanning digitizer tip or a point digitizer tip. The method including the steps of placing the patient in a variety of upright positions relevant to musculoskeletal problems and performing a series of rolling scans, with the scanning digitizer tip and single point landmark digitizations of musculoskeletal landmarks, with the point digitizer tip to obtain 3-dimensional skeletal data. The data is analyzed in order to provide clinically relevant 3-dimensional information relating to musculoskeletal quantities and imbalances. The apparatus further includes an upright column support and a retractable column support movable along the support column for supporting the patient. The digitizer includes a plurality of rotatable transducers and a plurality of link members linking the rotatable transducers. The digitizer is connected at one end to the support column and has a free end. The free end of the digitizer is adapted to accept the digitizer tip. The apparatus also includes a computer with the output of the digitizer connected to the computer to provide data to the computer for computing the position of the point or group of points on the patient's body in 3-dimensional space.

Further, it will be appreciated that everything in the physical world occupies volume or space. Position in a space may be defined by length, width and height which, in engineering terms, is often called an X, Y, Z coordinate. The X, Y, Z numbers represent the dimensions of length, width and height or three dimensions. Three-dimensional objects are described in terms of position and orientation; that is, not just where an object is but in what direction it points. The orientation of an object in space can be defined by the position of three points on the object. Orientation can also be described by the angles of alignment of the object in space. The X, Y, and Z coordinates can be most simply measured by three linear scales. In other words, if you lay a scale along the length, width and height of a space, you can measure the position of a point in the space.

Presently, coordinate measurement machines or CMM's measure objects in a space using three linear scales. These devices are typically non-portable, expensive and limited in the size or volume that can be easily measured.

FARO Technologies, Inc. of Lake Mary, Fla. (the assignee of the present invention) has successfully produced a series of electrogoniometer-type digitizing devices for the medical field. In particular, FARO Technologies, Inc. has produced systems for skeletal analysis known as METRECOM ® and systems for use in surgical applications known as SURGICOM ™. Electrogoniometer-type devices of the type embodied in the METRECOM and SURGICOM systems are disclosed in U.S. Pat. No. 4,760,851 (described above) and U.S. Pat. No. 5,305,203 issued Apr. 19, 1994 and U.S. Pat. No. 5,251,127 issued Oct. 5, 1993 all of which are assigned to the assignee hereof and incorporated herein by reference.

Problems of lower back pain are well-known, and it is believed that a significant contribution to such back problems can be attributed to improper sleeping position. Biomechanists and clinicians have determined that a sleeping position which allows the body to be in a neutral position is the one which causes the least stress on the various joints and more importantly the lower spine and pelvic area. Such a proper sleeping position is defined as the position in which the body centerline lies in a plane which is parallel to the ground, whereby the spine, pelvis, neck and lower legs are not required to rotate or bend with respect to each other in order to adapt to the sleeping surface (e.g., a mattress). Accordingly, a need exists for a method or a device which would allow individuals to sleep in this preferred sleeping position.

SUMMARY OF THE INVENTION

The above-discussed and other problems and deficiencies of the prior art are overcome or alleviated by the method and apparatus for measuring sleeping positions of the present invention. In accordance with the present invention, a method for measuring sleeping positions using a portable coordinate measuring machine is presented. The measured sleeping position information can be used to select or design a mattress which will result in a preferred sleeping position, whereby stresses on the individual's back and other muscles are minimized. The portable coordinate measuring machine (e.g., the CMM described in U.S. patent application Ser. No. 08/021,949) comprising a multijointed manually positionable measuring arm for accurately and easily measuring a plurality of points or landmarks of an individual.

The preferred mechanical measuring arm used in the CMM of this invention is generally comprised of a plurality of transfer housings (with each transfer housing comprising a joint and defining one degree of rotational freedom) and extension members attached to each other with adjacent transfer housings being disposed at right angles to define a movable arm having, in this example, five or six (at least two degrees) of freedom. In addition, each transfer casing includes visual and audio endstop indicators to protect against mechanical overload due to mechanical stressing.

The METRECOM system may be the preferred coordinate measuring machine for use with the method of the present invention, since the high accuracy of the coordinate measuring machine described in U.S. patent application Ser. No. 08/021,949 is not likely required.

In accordance with the method of the present invention, the 3-dimensional digitizer measures the vertical height of a point from the floor (or other level surface) or preferably the position of the point along an axis parallel to the floor. A number of body landmarks are measured so that the computer can determine the relative difference between the landmarks, whereby the body's (or individual's) center axis (or line) can be defined. From this information, a mattress can be designed or selected so that the individual's center line is maintained in a more or less parallel plane relative to the floor when the individual is in a sleep position. Thereby, eliminating the above-discussed problems related to improper sleeping positions.

The above-discussed and other features and advantages of the present invention will be appreciated and understood by those skilled in the art from the following detailed description and drawings.

BRIEF DESCRIPTION OF THE DRAWINGS

Referring to the drawings, wherein like elements are numbered alike in the several FIGURES:

FIG. 8 is an enlarged, side elevation view of a counterbalanced spring device used in the CMM of FIG. 1;

FIGS. 9A and 9B are top and bottom plan views depicting the handle/probe assembly of FIG. 1;

DESCRIPTION OF THE PREFERRED EMBODIMENT

Figure 1:
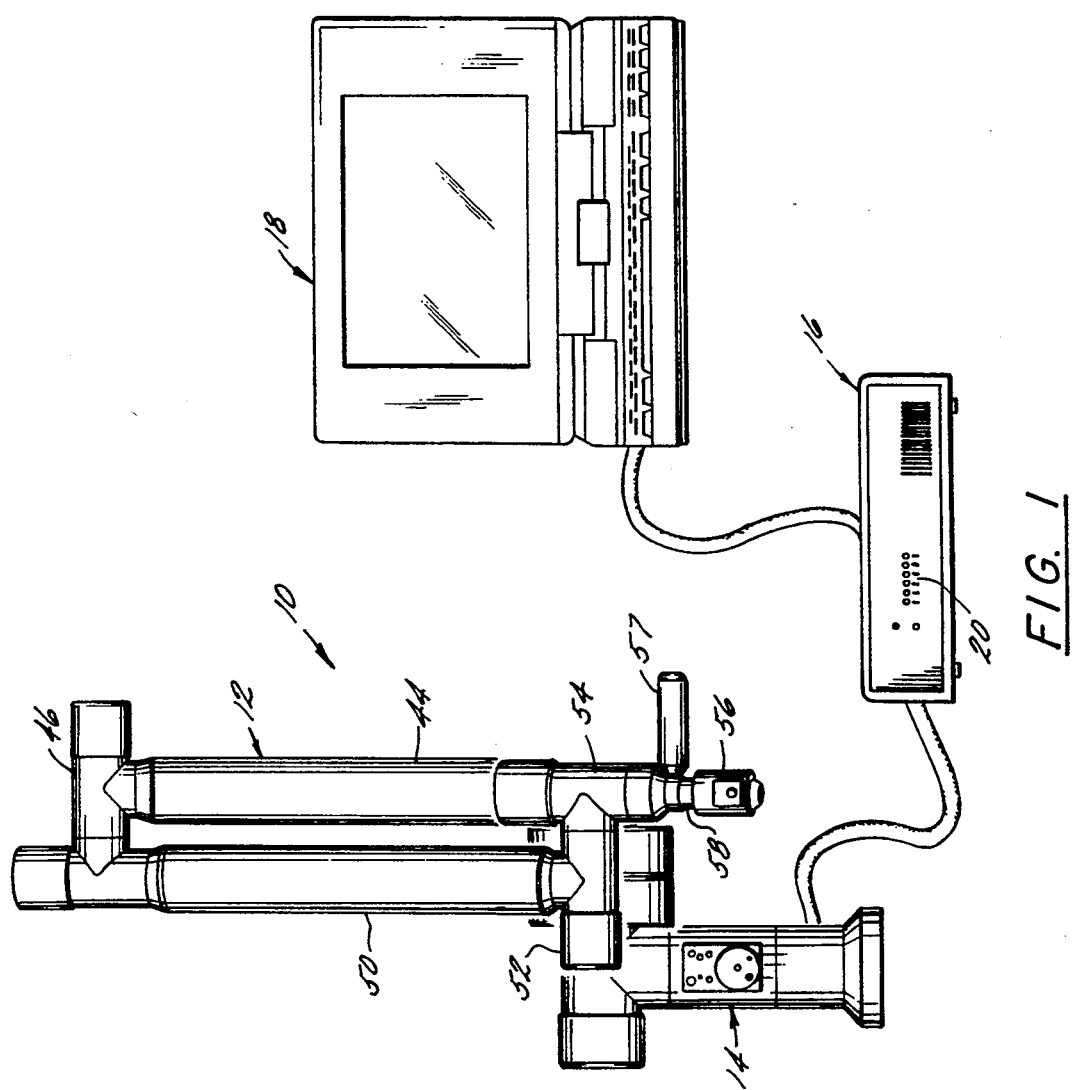
FIG. 1 is a front diagrammatic view depicting the three dimensional measuring system of the present invention including a coordinate measuring machine, a controller box and a host computer.

Referring first to FIG. 1, the three dimensional measuring system used in the present invention generally comprises a coordinate measuring machine (CMM) 10 composed of a manually operated multijointed arm 12 and a support base or post 14, a controller or serial box 16 and a host computer 18. It will be appreciated that CMM 10 electronically communicates with serial box 16 which, in turn, electronically communicates with host computer 18.

Figure 2:
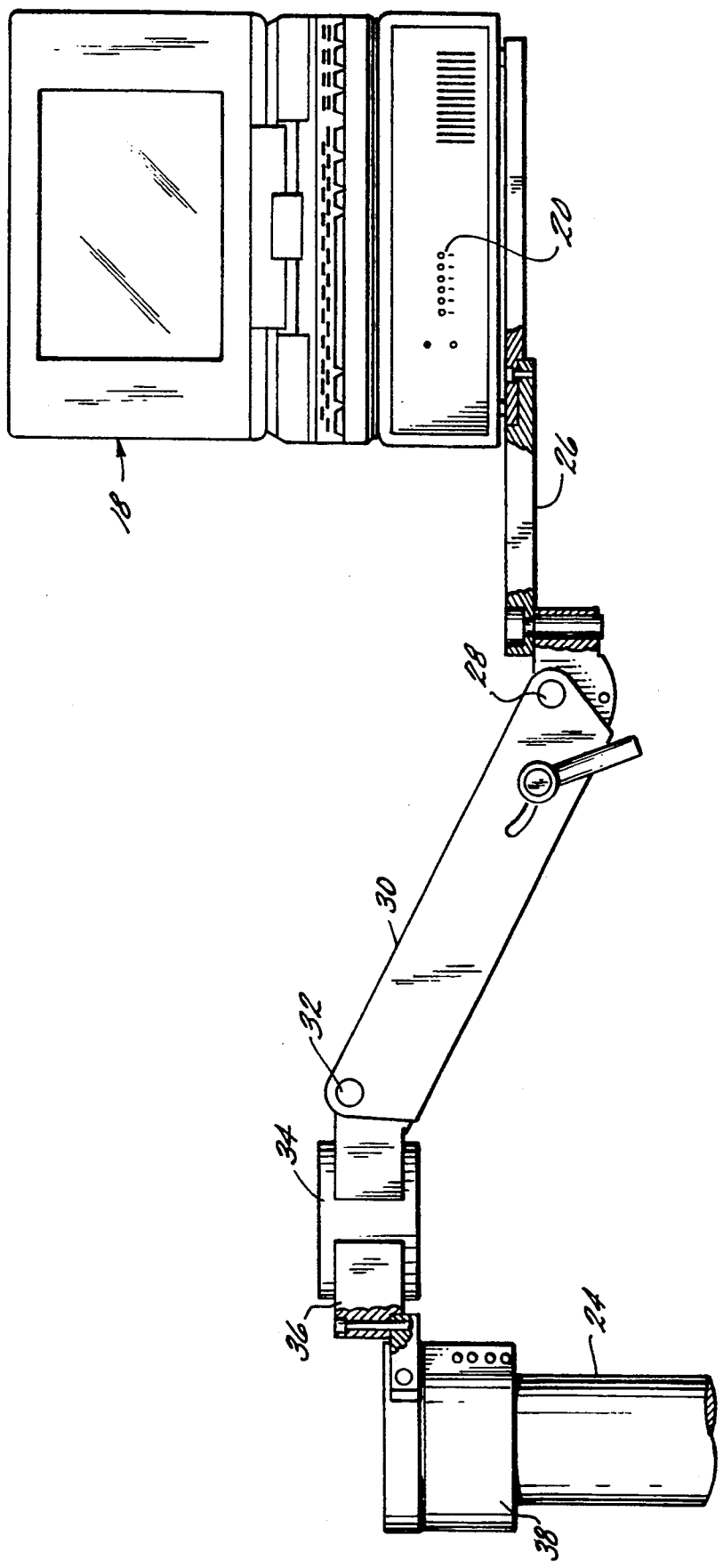
FIG. 2 is a side elevation view depicting the host computer mounted on the serial box, which is in turn, mounted on a maneuverable arm.
Figure 4:
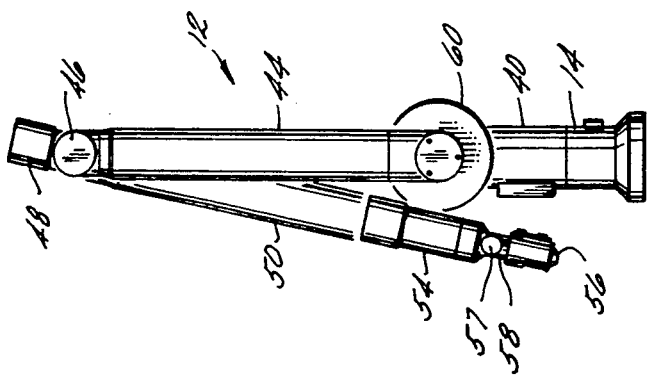
FIG. 4 is a rear elevation view of the CMM shown in FIG. 1.

As will be discussed in more detail hereinafter, CMM 10 includes transducers (e.g., one transducer for each degree of freedom) which gather rotational positioning data and forward this basic data to serial box 16. Serial box 16 provides a reduction in the overall requirements of host computer 18 to handle certain complex calculations and provides certain preliminary data manipulations. As shown in FIG. 2, serial box 16 is intended to be positioned under the host computer 18 (such as the notebook computer shown in FIG. 2) and includes EE-PROMS which contain data handling software, a microcomputer processor, a signal processing board and a number of indicator lights 20. As mentioned, basic transducer data is sent from CMM 10 to serial box 16. Serial box 16 then processes the raw transducer data on an ongoing basis and responds to the queries of the host computer with the desired three-dimensional positional or orientational information.

Figure 3:
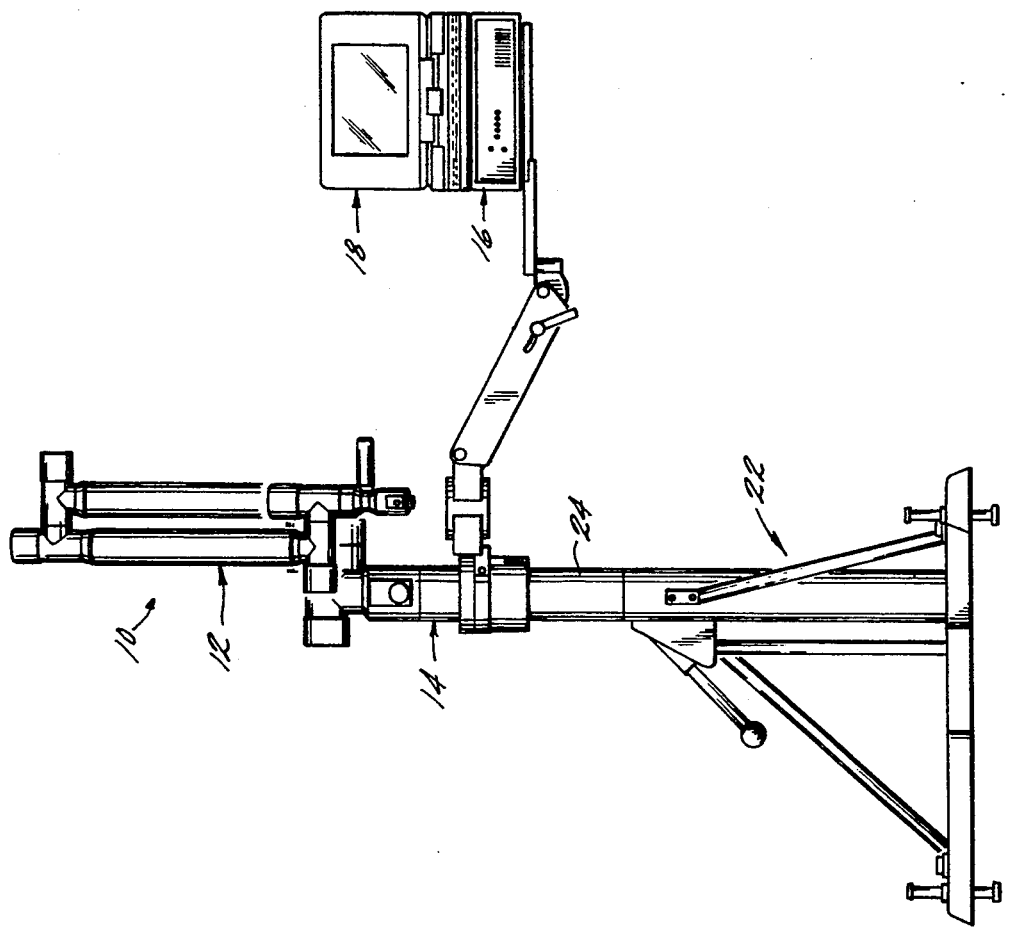
FIG. 3 is a side elevation view of the three dimensional measuring system of the present invention mounted on a theodolite stand.

Preferably, all three components defining the three dimensional measuring system of this invention (e.g., CMM 10, serial box 16 and host computer 18) are mounted on either a fixed mounting surface using a rigid plate and/or a standard optical measurement instrument thread followed by mounting on a known and standard theodolite mobile stand such as shown at 22 in FIG. 3. Preferably, theodolite stand 22 comprises a part no. MWS750 manufactured by Brunson. Such a mobile stand is characterized by a stable rolling platform with an extendable vertical tower and with common attachments and locking mechanisms. As shown in FIGS. 2 and 3, support base 14 of CMM 10 is threaded or otherwise attached onto a vertical support member 24 of stand 22 while serial box 16/host 18 is supported on a shelf 26 pivotally connected at a first joint 28 to an arm 30 which is pivotally connected to a second joint 32.

Connecting member 34 interconnects joint 32 to a swivel connection 36 attached to a cap 38 mounted over the top of member 24.

Figure 5:
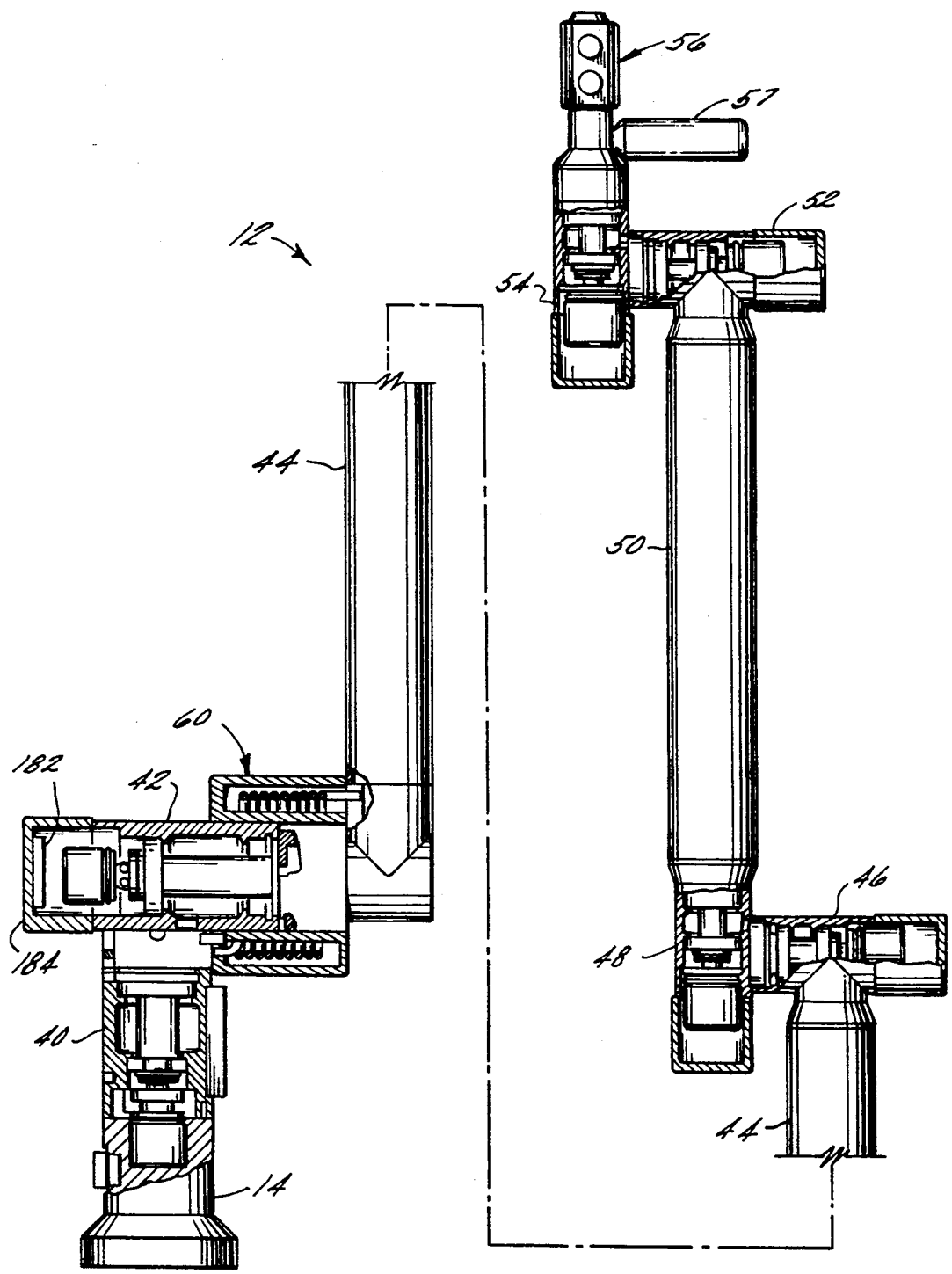
FIG. 5 is a longitudinal view, partly in cross-section of the CMM of FIG. 1.

Referring now to FIGS. 1 and 4–9, CMM 10 will now be described in detail. As best shown in FIG. 5, CMM 10 comprises a base 14 connected to a first set of two transfer housings including a first transfer housing 40 which, in turn, is connected to a second transfer housing 42 (positioned transverse to housing 40). A first extension member 44 is rigidly attached to a second set of two transfer housings including a third transfer housing 46 transversely attached to a fourth transfer housing 48. First extension member 44 is positioned perpendicularly between transfer housings 42 and 46. A second extension member 50 is aligned with and rigidly attached to transfer housing 48. Rigid extension member 50 is rigidly attached to a third set of two transfer housings including a fifth transfer housing 52 transversely attached to a sixth transfer housing 54. Fifth transfer housing 54 has attached thereto a handle/probe assembly 56.

Figure 6:
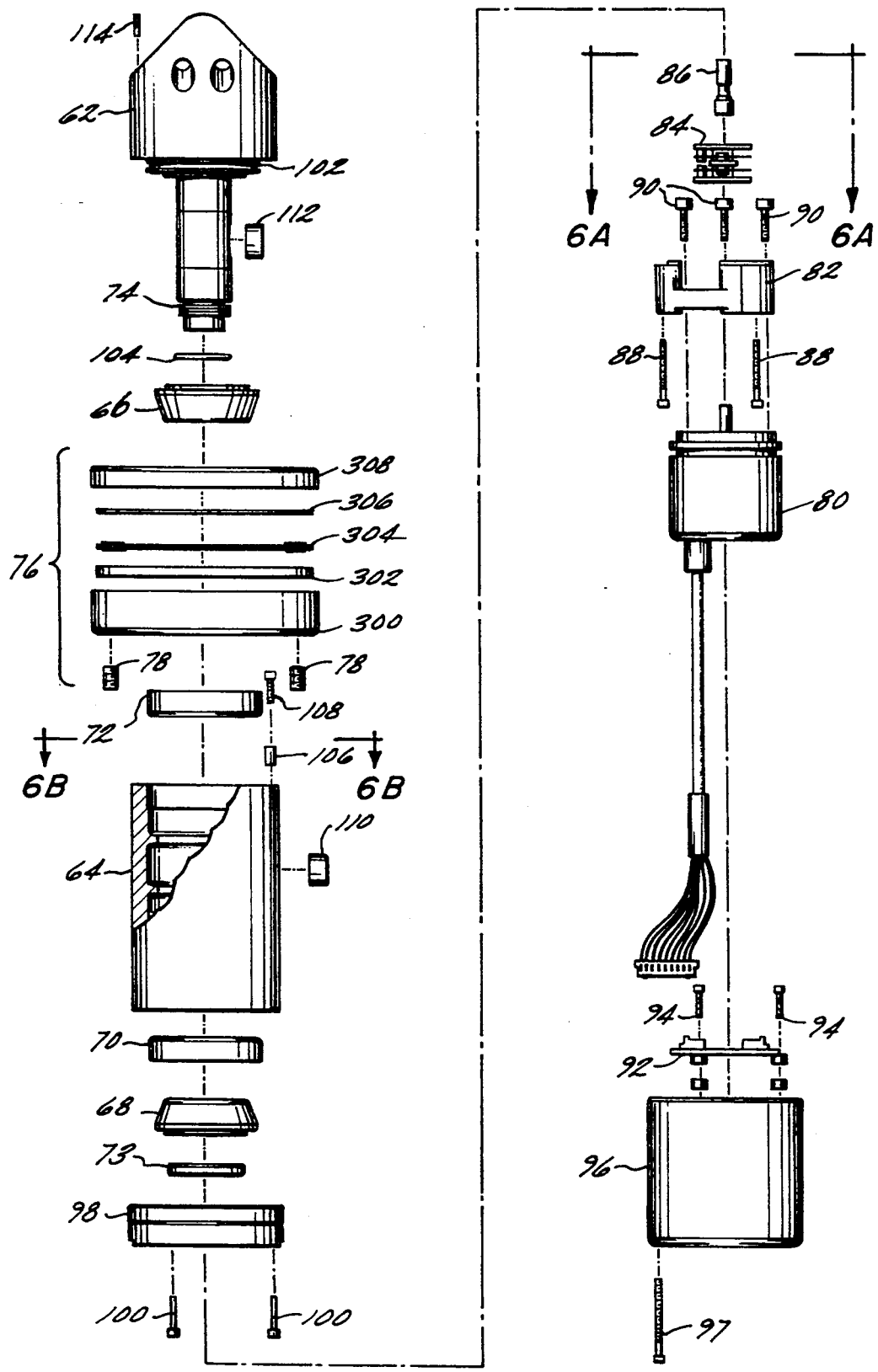
FIG. 6 is an exploded, side elevation view of a transfer housing used in the CMM of FIG. 1.

In general (and as will be discussed in more detail hereinafter), position sensing transducers are mounted in each of the six transfer housings 40, 42, 46, 48, 52 and 54. Each housing is comprised of bearing supports and transducer compartments which are made to then cylindrically attach to each other using 45° angled attachment screws (FIG. 6). At the base 14 is a counterbalanced spring device 60 for support of arm 12 in its standard vertical configuration (FIG. 8).

Figure 7:
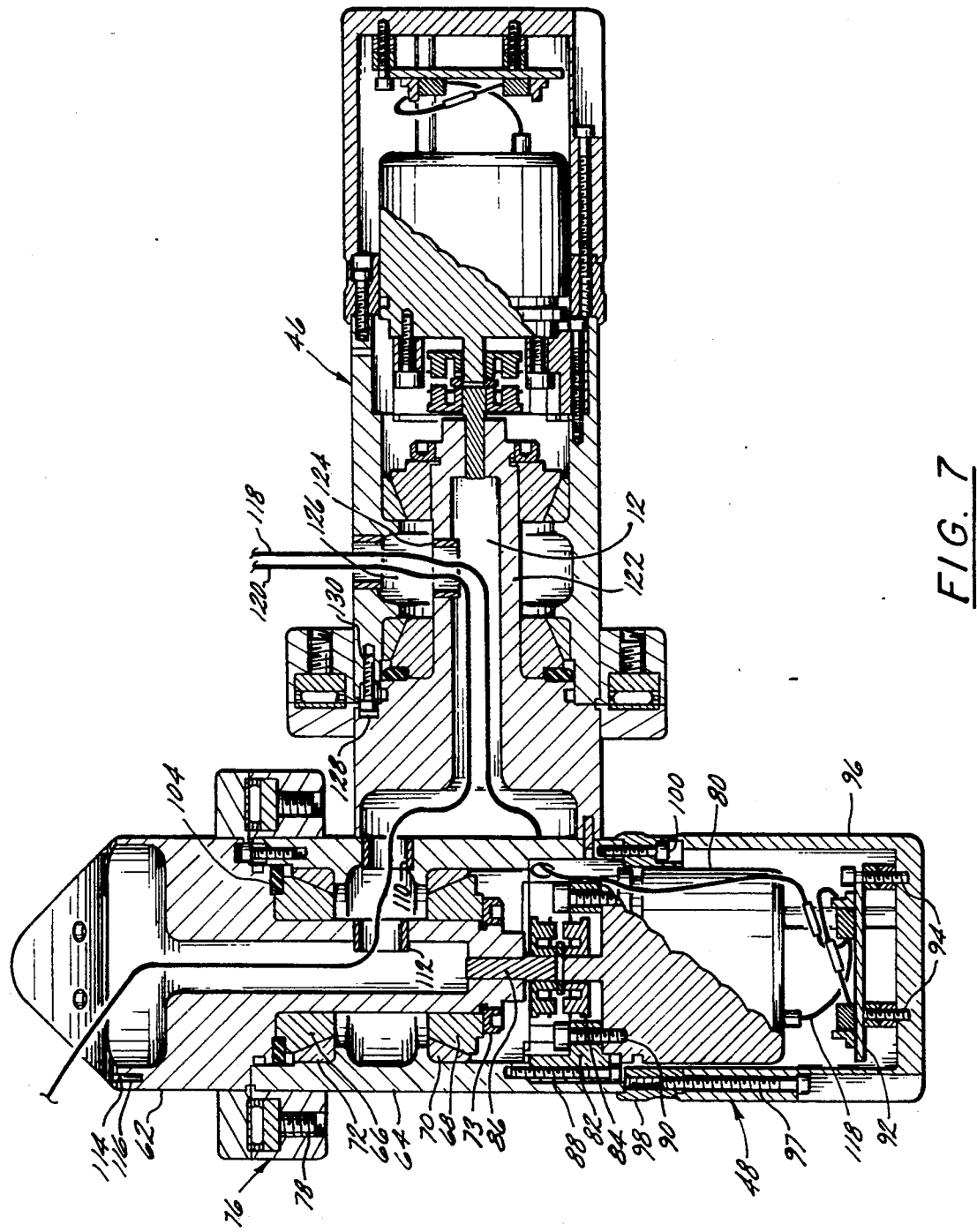
FIG. 7 is a cross-sectional elevation view of two assembled, transversely orientated transfer housings.

Turning now to FIGS. 6 and 7, a detailed description will be made of a transfer housing and its internal components. It will be appreciated that FIG. 6 is an exploded view of a transfer housing, while FIG. 7 shows an enlarged view of the transversely oriented and attached transfer housings (e.g., housings 46 and 48). Each housing includes an internal carrier 62 and an external casing 64. Mechanical stability between internal carrier 62 and external casing 64 is provided by two counter-positioned (e.g., oppositely disposed) conical roller bearings 66, 68 positioned to compress against their respective conical races, 70, 72. Conical races 70 and 72 are permanently affixed into the external transfer casing 64. Carrier 62 includes a shaft 122 extending therefrom and terminating at threading 74. Conical bearings 66, 69 are preferably made from hardened steel while races 70, 72 are also made from hardened steel.

Figure 6A:
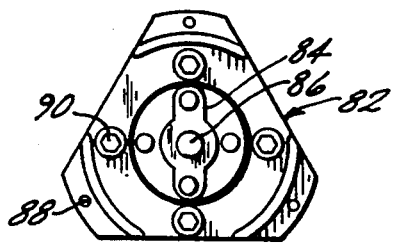
FIGS. 6A and 6B are views along the lines 6A—6A and 6B—6B, respectively, of FIG. 6.

During assembly of transfer casing 48, a compressional force is applied using a nut 73, which is tightened to a specific torque on threads 74, providing a prestressed bearing situation resulting in no motion other than axial rotation under typically applied loads. Because of the necessity of a low profiled or such an arm during manual handling and the attendant reduction in the overall stiffness, it is preferable and, in fact required in certain applications, to also install a thrust bearing 76 at the interface between carrier 62 and casing 64. Thrust bearing 76 provides further mechanical stiffening between carrier 62 and casing 64 of the transfer housing. Thrust bearing 76 comprises five elements including thrust adjustment ring 300, flat annular race 302, roller bearing and cage 304, annular race 306 and opposing thrust cover 308. Thrust bearing 76 is adjusted through a series of set screws 78 and provides for high bending stiffness. The transducer, (preferably an encoder 80 such as is available from Heidenhain under the designation Mini-Rod, part no. M-03600), is mounted to a universal mounting plate 82 for mounting into the transfer casing. Universal mounting plate 82 is important in satisfying possible component availability problems such that a change in manufacture of transducer 80 and, hence, the change in mounting screw configuration can be accommodated through modifications in the mounting plate 82. Mounting plate 82 is shown in FIG. 6A as a triangular shaped plate having rounded corners. FIG. 6A also depicts threaded members 88 and 90, a pin 86 and a coupler 84 (all of which are discussed hereinafter).

Figure 6B:
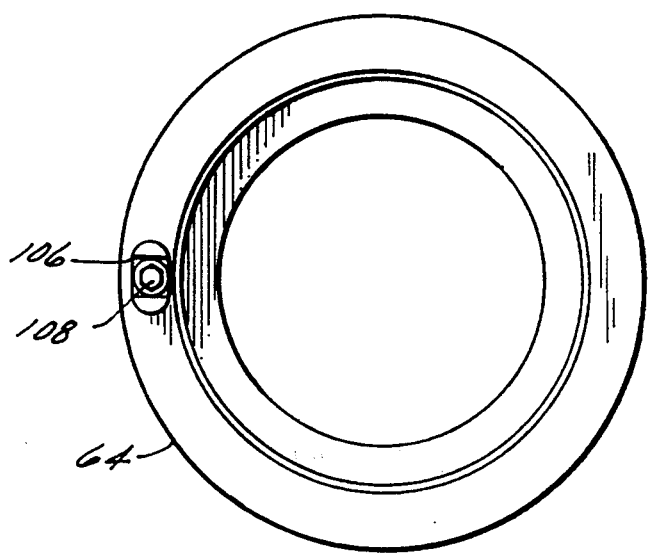

High accuracy rotational measurements using encoders 80 require that there should be no loads applied to the encoders and that motion of the transfer casing be accurately transmitted to the encoder despite small misalignments of the axis of the transfer casing and axis of the encoder. The angular transfer errors are well known to those skilled in the art from the published encoder literature. Communicating with encoder 80 is a coupler 84 such as is available from Rembrandt under the designation B1004R51R. An extension shaft 86 is utilized for ultimately connecting encoder 80 to the transfer casing 64. Shaft 86 is attached both to coupler 84 and to the end of carrier 62 at threading 74 using set screws 88, 90 (see FIG. 7). An electronic preamplifier board 92 is positioned in close proximity to encoder 80 and is mounted (via screws 94) on the inside of cap cover 96. Cap cover 96 is attached to casing 64 via screw 97. A transition housing 98 interconnects cap cover 96 to casing 64 via screw 97 and screws 100. Sealing of the transfer housing to the environment is accomplished at the joint using an O-ring groove 102 in which is mounted a standard rubber O-ring groove 104. A rotational endstop 106 (to be discussed hereinafter), is best shown in FIG. 6B and comprises a square shaped metal housing having an opening therethrough which is mounted onto casing 64 using bolt 108 threaded through the opening of the housing. Wires pass through grommets to stop abrasion over long term use are mounted on both carrier 62 and casing 64 at 110 and 112. A location pin 114 is received by a complimentary shaped recess 116 in carrier 62 for the purpose of maintaining relative orientation of two adjacent transfer casings.

Referring to FIG. 7, for environmental and other reasons, it is important that all wires be completely hidden from sight and, therefore, contained within the arm 12. FIG. 7 depicts two assembled transfer housings 46, 48 mounted perpendicularly to each other and demonstrating the passage of wires. It will be appreciated that during use of CMM 10, the encoder information from encoder 80 is passed to its processor board 92 through wire 118 which is then amplified and passed through the arm by machined passageways 120. Wire 118 then passes through a channel 120 in the shaft 122 of the internal carrier 62 of the transfer casing 46 and through a grommetted hole 124 at which time it passes into a large cavity 126 machined on the external casing 64 of transfer housing 46. Cavity 126 permits the coiling of the wire strands during rotation of the transfer casing and is configured so as not to produce any wire abrasion and a minimum of wire bending. However, because the wire limits the overall ability to fully rotate, an incomplete spherical groove 128 is created in which is positioned an endstop screw 130, which limits the full rotation, in this case to 330°. It will be appreciated that the pass through channel 120 and wire coiling cavities 122 are subsequently repeated in each transfer casing allowing the wires to progressively make their way down to the connector mounted at the base 14, resulting in no exposed wiring.

Turning now to FIG. 8, the construction of the aluminum arm as well as the various bearings and transducers results in an accumulated weight of approximately 10 to 15 pounds at the probe handle assembly 56 of CMM 10. Under normal circumstances, this would create a significant amount of fatigue during use and, hence, must be counterbalanced. Weight counterbalances are not preferred since they would significantly increase the overall weight of the device when being considered for transportability. Therefore, in a preferred embodiment counterbalancing is performed using counterbalance device 60 which comprises a torsional spring 132 housed in a plastic casing 134 and mounted at transfer housing 42 at base 14 for providing a lift for arm 12. Coiled torsional spring 132 can be mounted in a variety of positions affecting the overall pretension and, hence, may be usable on a variety of lengths and weights of arms 12. Similarly, due to the weight of arm 12 and the effect of the recoiled spring, significant shock loads may occur when repositioning the arm to the storage position. To prevent significant shocking of the arm upon retraction, air piston shock absorber 134 is also configured into plastic housing 142 of counterbalance spring device 60. This results in an absorption of the shock load and slow relaxation into the rest position. It will be appreciated that FIG. 8 depicts the shock absorber 134 in a depressed configuration.

In FIGS. 9A and 9B, top and bottom views of probe handle assembly 56 are shown. Probe handle assembly 56 is meant to be held as either a pencil or pistol grip and possesses two switches (items 150 and 152 in FIG. 9A) for data taking, a connector (item 154 in FIG. 9B) for the attachment of optional electronics and a threaded mount 156 for receiving a variety of probes. Because the CMM 19 is a manual measurement device, the user must be capable of taking a measurement and then confirming to CMM 10 whether the measurement is acceptable or not. This is accomplished through the use of the two switches 150, 152. The front switch 150 is used to trap the 3-dimensional data information and the back switch 152 confirms its acceptance and transmits it to the host computer 18. On the back of the switch enclosure 158 (housing 150, 152) is connector 154 which possesses a number of voltage lines and analog-to-digital converter lines for general attachment to a number of options such as a touch probe.

Figures 10A, 10B:
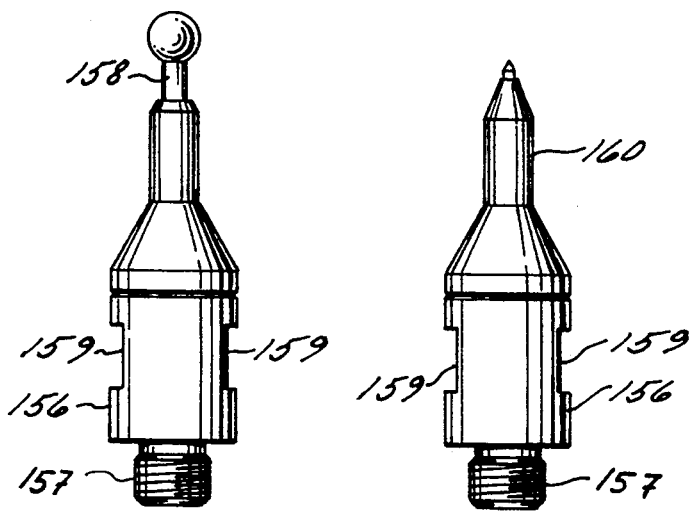
FIGS. 10A and 10B are respective side elevation views of a ball probe and a rounded probe.

A variety of probes may be threaded to handle assembly 56. In FIG. 10A, hard $\frac{1}{4}$ inch diameter ball probe 158 is shown while in FIG. 10B, a hard $\frac{1}{4}$ inch rounded probe 160 is shown. Both probes 158, 160 are threadably mounted to mount 156 (using male threaded member 157), which in turn, is threadably mounted to probe housing 58. Mount 156 also includes a plurality of flat surfaces 159 for facilitating engagement and disengagement of the probes using a wrench.

Figure 11:
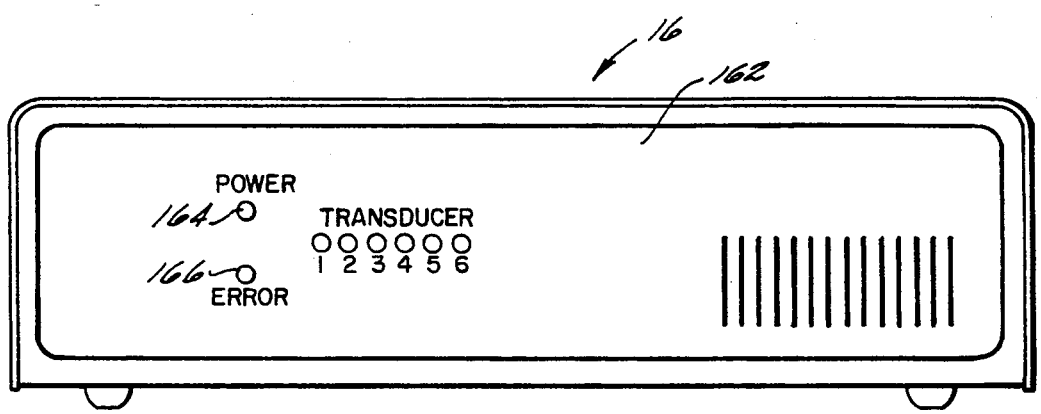
FIG. 11 is an enlarged front view of the controller box of FIG. 1.
Figure 12:
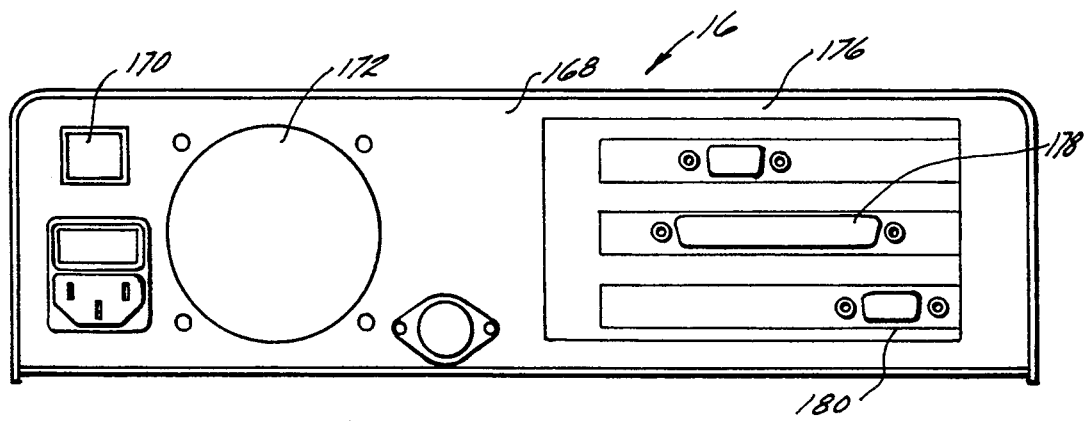
FIG. 12 is an enlarged rear view of the controller box of FIG. 1.

Turning now to FIGS. 11 and 12, a description of the controller or serial box 16 now follows. FIG. 11 shows the front panel face 162 of the controller or serial box 16. Front panel 162 has eight lights including power indicator light 164, error condition light 166, and six lights 20, one for each of the six transducers (identified as items 1–6) located in each transfer housing. Upon powering up, power light 164 will indicate power to the arm 12. At that time, all six transducer lights will indicate the status of each of the six transducers. The transducers are preferably incremental digital optical encoders 80 and require referencing. However, the transducers may be analog devices. Hence, upon start up, each of the six joints (e.g., transfer housings) must be rotated to find the reference position at which time the six lights shall turn off.

During use, should any of the transducers approach its rotational endstop 106 from within 2 degrees, a light and an audible beep for that particular transducer indicates to the user that the user is too close to the end stop; and that the orientation of the arm should be readjusted for the current measurement. The serial box 16 will continue to measure but will not permit the trapping of the data until such endstop condition is removed. A typical situation where this endstop feature is necessary is the loss of a degree of freedom by the rotation of a particular transducer to its endstop limit and, hence, the applications of forces on the arm causing unmeasured deflections and inaccuracies in the measurement.

At any time during the measurement process, a variety of communication and calculation errors may occur. These are communicated to the user by a flashing of the error light and then a combination of lights of the six transducers indicating by code the particular error condition. It will be appreciated that front panel 162 may alternatively utilize an alphanumeric LCD panel giving alphanumeric error and endstop warnings.

Turning to FIG. 12, the rear panel 168 of serial box 16 includes a variety of standard PC connectors and switches including a reset button 170 which resets the microprocessor; an AC input fan 172 for air circulation; a connector 174 for a standard PC AT keyboard, connector 176 for an optional VGA board for monitoring of the internal operations of serial box 16, connector 178 for receiving the variety of signal lines for the CMM data, and connector 180 for the standard RS232 connector for the host 18.

Serial box 16 is responsible for monitoring the temperature of the CMM and in real time modifying the kinematics or mathematics describing its motion according to formulas describing the expansion and contraction of the various components due to changes in temperature. For this purpose, and in accordance with an important feature of this invention, a temperature monitoring board 182 (which includes a temperature transducer) is positioned at the location of the second joint 42 on the interior of a cover 184 (see FIGS. 4 and 5). CMM 10 is preferably constructed of aircraft grade aluminum externally and anodized. Preferably, the entire arm 12 is constructed of the same material except for the mounting screws which are stainless steel. The same material is used throughout in order to make uniform the expansion and contraction characteristics of arm 12 and make it more amenable to electronic compensation. More importantly, the extreme degree of stability required between all parts through the large temperature range requires that there be no differential thermal expansion between the parts. As mentioned, the temperature transducer 182 is preferably located at transfer housing 42 because it is believed that this location defines the area of highest mass and is therefore the last area to be stabilized after a large temperature fluctuation.

Figure 13:
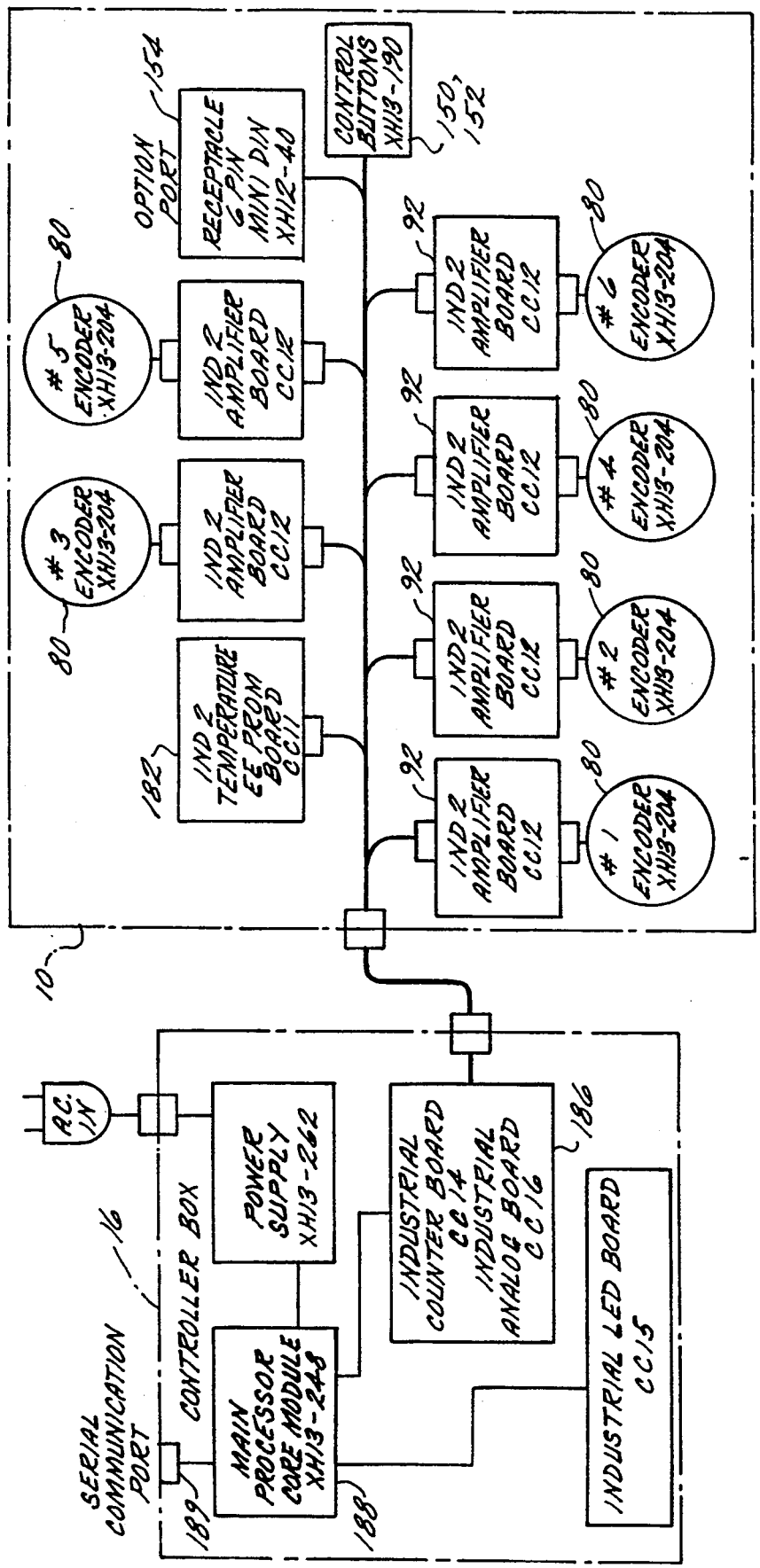
FIG. 13 is a schematic view of the electronic components for the three dimensional measuring system of FIG. 1.

Referring now to FIG. 13, the overall electronic schematic layout for CMM 10 and serial box 16 is shown. Six encoders 80 are shown with each encoder having an amplifier board 92 located in close proximity to it for the minimization of noise on signal transfer. An option port 154 is shown which is a six pin connector available at the handle 56 for the attachment of a variety of options. Two control buttons 150 and 152 for indicating to serial box 16 the measurement process, are also shown.

The temperature transducer is associated with a temperature circuit board 182 which is also located in arm 12 as shown in FIG. 13. In accordance with still another important feature of this invention, the temperature board 182 comprises an EEPROM board. The EEPROM is a small computerized memory device (electrically erasable programmable read only memory) and is used to contain a variety of specific calibration and serial number data on the arm. This is a very important feature of this invention which permits high quality control of CMM 10 and importantly, precludes the inadvertent mixup of software and arms. This also means that the CMM arm 12 is a stand alone device not requiring specific calibration data to reside in controller box 16 which may need to be separately serviced and/or switched with other machines.

The electronic and pulse data from the arm electronics is then transmitted to a combined analog-to-digital converter/digital counting board 186 which is a paired set comprising a 12 bit analog to digital converter and a multi channel 16 bit digital counter. Board 186 is positioned on the standard buss of the controller box. The counting information is processed using the core module 188 (comprising a commercially available Intel 286 microprocessor such as a part number CMX-286-Q51 available from Ampro) and programs stored on an EEPROM also residing in the controller box. Subsequent data is then transmitted through the serial communication port 189.

The microprocessor-based serial box 16 permits preprocessing of calculations specific to CMM 10 without host level processing requirements. Typical examples of such preprocessor calculations include coordinate system transformations and outputting data in specific formats required for downloading to a variety of hosts and user programs.

The serial box is configured to communicate with a variety of host formats including PC, MSDOS, Windows, Unix, Apple, VME and others. Thus, the serial box processes the raw transducer data on an ongoing basis and responds to the information requests or polling of the host computer with the desired three dimensional positional or orientational information. The language of the serial box is in such a form that drivers or computer communication subroutines in microprocessor 188 are written in the language of the host computer so as to drive the serial port and communicate with CMM 10. This function is designated the "intelligent multi-protocol emulation and autoswitching" function and works as follows: A variety of host programs may be installed on the host computer. These host programs will poll the serial port with a variety of requests to which the serial box must respond. A number of protocols have been preprogrammed into the serial box to responds to polls or inquiries on the serial port for a variety of different, popular softwares. A polling request by a software requires a specific response. The serial box will receive the polling request, establish which protocol it belongs to, and respond in the appropriate manner. This allows transparent communication between CMM 10 and a wide variety of application software such as computer aided design and quality control softwares, e.g., AutoCad ® from Autodesk, Inc., CADKEY ® from Cadkey, Inc., and other CAD programs; as well as quality control programs such as GEOMET ® from Geomet Systems, Inc. and Micromeasure III from Brown and Sharpe, Inc.

The three dimensional CMM of the present invention operates as follows. Upon power up, the microprocessor 188 in the serial box 16 undergoes start up self-checking procedures and supplies power through the instrument port to arm 12 of CMM 10. The microprocessor and software residing on EEPROM 182 determines that upon initial power up none of the encoders 80 have been initialized. Hence, the microprocessor 188 sends a signal to the display board lighting all the lights 20, indicating a need to be referenced. The user will then mechanically move the arm which will cause the transducers to individually scan their range, at which time a reference mark is passed. When the reference mark is passed, the digital counter board 186 responds by trapping its location and identifying to the front display board 20 that the transducer has been referenced and the light is extinguished. Once all transducers have been referenced, the system establishes serial communication with the host and waits for further instruction. Pressing of the front or back button of handle 56 will initiate a measurement process. Pressing the front button 150 will trap the current transducer readings. Pressing the back button 152 will indicate to the microprocessor that these values are to be translated into dimensional coordinates and issued through the serial port to the host 18. The host 18 and the serial box 16 will then continue to react to each other's serial line requests.

Subsequent to assembly of CMM 10, the device is optimized or calibrated in accordance with the method describe in U.S. patent application Ser. No. 08/021,949. Further, the CMM 10 is initialized in the same manner described in U.S. patent application Ser. No. 08/021,949.

While the above generally describes the coordinate measuring machine of U.S. patent application Ser. No. 08/021,949, such a high accuracy measuring device, may not be required. It may be preferred, from a cost standpoint, that the aforementioned METRECOM MODEL: IND-01 Coordinate Measuring Machine commercially available from FARO Technologies, Inc., Industrial Division, 125 Technology Park, Lake Mary, Fla. 32746 (assignee of the present invention) be employed. The METRECOM system performs the same functions as the above described system, however with reduced accuracy and at a substantial cost savings. The IND-01 model differs from the above described CMM in that an external processor is not used. An analog-to-digital interface board is preferably installed directly into host computer 18 with direct connection/communication with the transducers in the arm. However, an analog-to-digital converter could alternatively be housed in a separate box having a serial or parallel output. Further, the IND-01 model does not include temperature compensation or pre-amplifier boards at each of the joints. Also, ball bearings are used in place of the conical roller bearings, although each transfer casing has double bearings which are pre-assembled and stressed in the same manner.

A CMM (e.g., as described above with reference to U.S. patent application Ser. No. 08/021,949 or the METRECOM Model: IND-01) is used to measure body landmarks of an individual. It will be appreciated that, while a multi-axial rotational device as described above is preferred, a linear measurement type apparatus may suffice. For example, an electronic height gauge could be used for some of the measurements.

Figure 14:
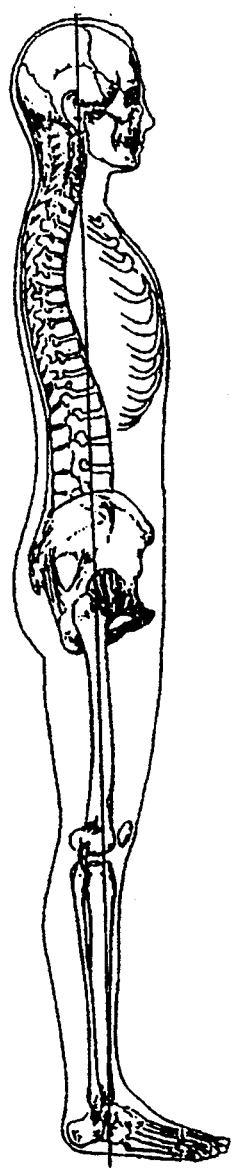
FIG. 14 is a side elevational view of the theoretical optimum body position with a straight line drawn through specific landmarks as per an idealized upright posture.
Figure 17:
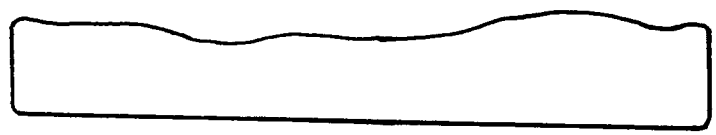
FIG. 17 is an elevational view of a sleeping product having varying thicknesses for leveling purposes.

Prior to measuring these landmarks certain information regarding the individual's sleeping habits are entered into the computer. A preferred sleeping position is selected from the below list;
(1) Prone (face down),
(2) Supine (on the back),
(3) Fetal (curled on the side), or
(4) Fetal/Prone (upper body face down and legs curled on the side). Also, whether a pillow is use and the type of pillow used (i.e, firm or soft) is entered. Menus can be employed to enter the above and other information. Again, theoretically the optimum body position is one which allows a straight line to be drawn through specific landmarks as per an idealized upright posture, see FIG. 14. It will be appreciated, that it will not always be possible to touch (i.e., probe or measure) all relevant landmarks and certain assumptions may have to be made as a function of body types and proportions for typical individuals requiring measurement adjustments, referred to herein as Z-adjustments. Handle/probe assembly 56 (after having been initialized) is positioned at the following landmarks and these positioned are stored:
(1) top middle of the head (optional depending on pillow use),
(2) top left shoulder,
(3) top right shoulder,
(4) base of the spine,
(5) the highest point of the left knee,
(6) the highest point of the right knee,
(7) the highest point of the left ankle,
(8) the highest point of the right ankle,
(9) the front of the left hip bone, and
(10) the from of the right hip bone.

The aforememioned Z-adjustments are a function of pelvic (i.e., hip bone measurements), knee and ankle measurement and of the distance between various landmarks or bone length. It is sufficient for the present invention that any differences are to be rounded to the nearest inch. A total of five offsets are to be determined at the head, shoulder, pelvis, knee and ankle. Alignment is defined as an index as follows:

ALIGNMENT INDEX=HEAD OFFSET+SHOULDER OFFSET+HIP OFFSET+KNEE OFFSET with the ankle offset being the reference.
Z-offsets are calculated as follows:

$ANKLE_{REF}=(POSITION_{LEFT\ ANKLE(Z)}+POSITION_{RIGHT\ ANKLE(Z)})/2+ZADJUSTMENT_{ANKLE}/2$, $HEAD\ OFFSET=POSITION_{HEAD}-ANKLE_{REF}$, $SHOULDER\ OFFSET=(POSITION_{LEFT\ SHOULDER(Z)}+POSITION_{RIGHT\ SHOULDER(Z)})/2-ANKLE_{REF}$, $HIP\ OFFSET=POSITION_{BASE\ OF\ SPINE}-ANKLE_{REF}$, or $HIP\ OFFSET=(POSITION_{LEFT\ HIP(Z)}+POSITION_{RIGHT\ HIP(Z)})/2+ZADJUSTMENT_{HIP}-ANKLE_{REF}$, $KNEE\ OFFSET=(POSITION_{LEFT\ KNEE(Z)}+POSITION_{RIGHT\ KNEE(Z)})/2+ZADJUSTMENT_{KNEE}/2-ANKLE_{REF}$.

The Z-adjustments (ZADJUSTMENT) are calculated as follows:

$ZADJUSTMENT_{ANKLE}=-K_{ANKLE}*LENGTH_{HIP\ TO\ KNEE}$, $ZADJUSTMENT_{KNEE}=-K_{KNEE}*LENGTH_{HIP\ TO\ KNEE}$, $ZADJUSTMENT_{HIP}=-K_{HIP}*LENGTH_{HIP\ TO\ KNEE}$, where $K_{ANKLE}$, $K_{KNEE}$ and $K_{HIP}$ are proportions expected for different body types, for example, $K_{ANKLE}$ is the thickness of the ankle in the medial lateral direction or anterior posterior direction as a ratio to the length of the femur, the long bone from the hip to the knee. Alternatively, a body type may be selected before proceeding with measurements to provide extra precision in selection of the correct K values. Such selection could be made from a menu at the host computer. The hip (i.e., pelvis) to knee length has been found to be an excellent representation of overall bone size.

Figure 15:
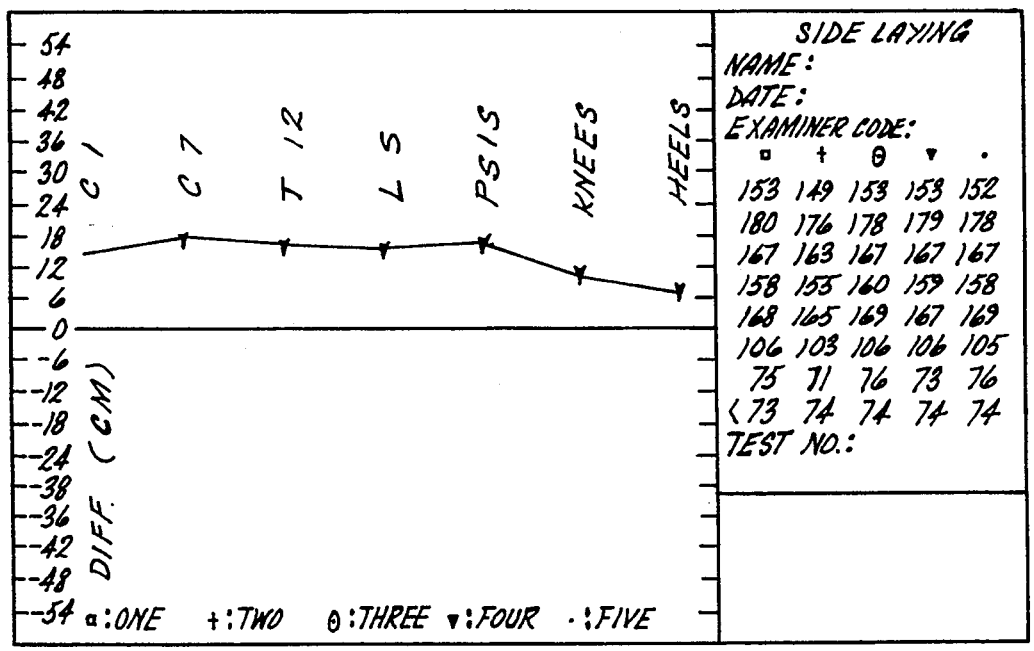
FIGS. 15 and 16 are views of a computer screen display showing examples of digitized landmark measurements defining the center axis of an individual relative to the floor in a selected preferred sleeping position.
Figure 16:
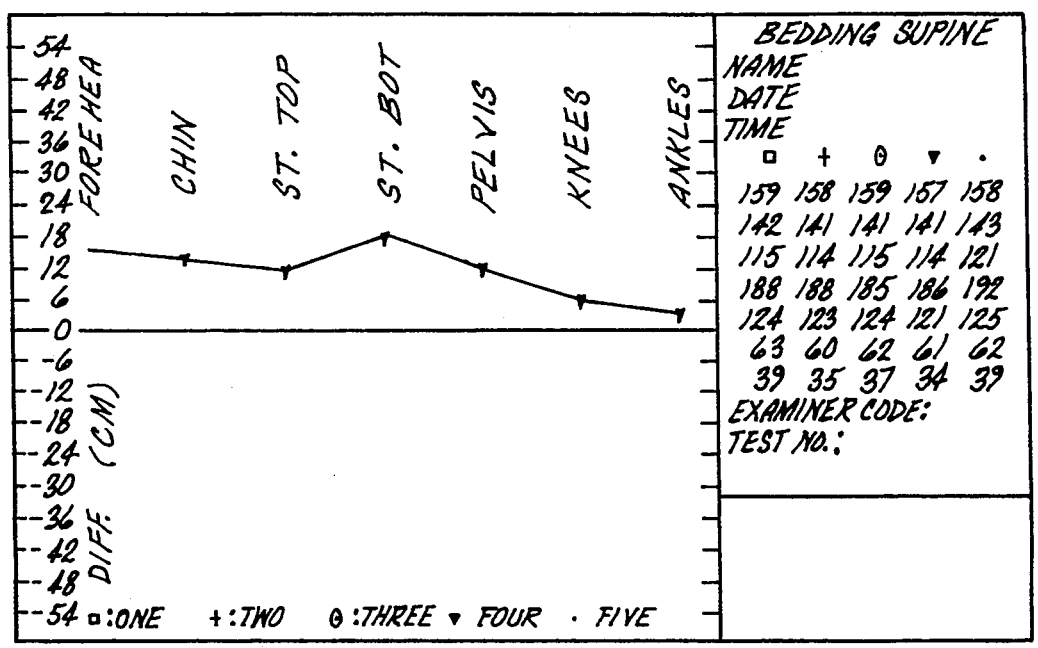

Once these landmarks have been digitized and the digitized measurements adjusted as described above the center axis of the individual is displayed relative to the floor (or a plane parallel thereto) on the computer screen. It will be appreciated that the digitized landmarks were taken while the individual was lying in the selected preferred sleeping position, see examples in FIGS. 15 and 16. A mattress is then selected which will provide the best leveling of the individuals center line in the desired sleep position. Information on a plurality of mattresses can be loaded into the computer and the computer can make this levelness determination, whereby the mattress with the most level body center line for the individual is selected, using the alignment index defined above. Thereby, eliminating many of the above-discussed problems related to improper sleeping positions.

Alternatively, a mattress or bed can be designed where mattress stiffness in the regions of the shoulders, pelvis, and feet (ankles) is varied or variable so as to result in a leveling of sleeping position. In will be appreciated that portions of a mattress can be elevated or lowered at various regions or can be manufactured with varying thicknesses over the length of a mattress to accomplish the same purpose.

While preferred embodiments have been shown and described, various modifications and substitutions may be made thereto without departing from the spirit and scope of the invention. Accordingly, it is to be understood that the present invention has been described by way of illustrations and not limitation.

What is claimed is:
1. A method of performing sleep position analysis on an individual using a coordinate measuring system having a probe for digitizing coordinates, the method comprising the steps of:
positioning an individual in a selected generally horizontal sleeping position;
probing a plurality of landmarks on the individual using said probe to provide a plurality of said digi- tized coordinates each corresponding to one of said landmarks; and analyzing said plurality of said digitized coordinates to determine a center axis of the individual in the selected sleeping position, said center axis defining a sleeping posture of the individual in the selected sleeping position.

2. The method of claim 1 further comprising the step of:

adjusting the individual's sleeping position by increasing levelness of said center axis of the individual in the selected sleeping position, whereby said sleeping posture in the selected sleeping position is improved.

3. The method of claim 1 wherein said selected sleeping position comprises:

prone, supine, fetal, or fetal/prone.

4. The method of claim i wherein said plurality of landmarks comprise:

a position at about the top left shoulder of the individual, a position at about the top right shoulder of the individual, a position at about the base of the spine of the individual, a position at about the highest point of the left knee of the individual, a position at about the highest point of the right knee of the individual, a position at about the highest point of the left ankle of the individual, a position at about the highest point of the right ankle of the individual, a position at about the front of the left hip bone of the individual, and a position at about the front of the right hip bone of the individual.

5. The method of claim 4 wherein said plurality of landmarks further comprise:

a position at about the top middle of the head of the individual.

6. The method of claim 1 further comprising the step of:

extrapolating one of said digital coordinates corresponding to one of said landmarks, wherein said one of said landmarks is unprobable.

7. The method of claim 6 wherein said step of extrapolating comprises use of a ZADJUSTMENT.

8. The method of claim 6 wherein said ZADJUSTMENT comprises:

$$ZADJUSTMENT_{ANKLE} = -K_{ANKLE} * LENGTH_{HIP\ TO\ KNEE},$$

$$ZADJUSTMENT_{KNEE} = -K_{KNEE} * LENGTH_{HIP\ TO\ KNEE}, \text{ or}$$

$$ZADJUSTMENT_{HIP} = -K_{HIP} * LENGTH_{HIP\ TO\ KNEE},$$

where $K_{ANKLE}$ is ankle thickness, $K_{KNEE}$ is knee thickness and $K_{HIP}$ is hip thickness.

9. The method of claim 8 wherein said center axis is defined by an alignment index comprising:

ALIGNMENT INDEX = HEAD OFFSET + SHOULDER OFFSET + HIP OFFSET + KNEE OFFSET, where said head, shoulder, hip, and knee offsets comprise, $$HEAD\ OFFSET = POSITION_{HEAD} - ANKLE_{REF},$$

$$SHOULDER\ OFFSET = (POSITION_{LEFT\ SHOULDER(Z)} + POSITION_{RIGHT\ SHOULDER(Z)})/2 - ANKLE_{REF},$$

$$HIP\ OFFSET = (POSITION_{LEFT\ HIP(Z)} + POSITION_{RIGHT\ HIP(Z)})/2 + ZADJUSTMENT_{HIP} - ANKLE_{REF}, \text{ and}$$

$$KNEE\ OFFSET = (POSITION_{LEFT\ KNEE(Z)} + POSITION_{RIGHT\ KNEE(Z)})/2 + ZADJUSTMENT_{KNEE}/2 - ANKLE_{REF},$$

where, $$ANKLE_{REF} = (POSITION_{LEFT\ ANKLE(Z)} + POSITION_{RIGHT\ ANKLE(Z)})/2 + ZADJUSTMENT_{ANKLE}/2.$$

10. The method of claim 9 wherein said hip offset comprises:

$$HIP\ OFFSET = POSITION_{BASE\ OF\ SPINE} - ANKLE_{REF}.$$

11. The method of claim 2 wherein said step of adjusting the individual's sleeping position by increasing levelness of said center axis of the individual in the selected sleeping position comprises selecting a sleeping product.

12. The method of claim 11 wherein said sleeping product is a mattress.

13. The method of claim 2 wherein said step of adjusting the individual's sleeping position by increasing levelness of said center axis of the individual in the selected sleeping position comprises designing a sleeping product having means for leveling said center axis.

14. The method of claim 13 wherein said means for leveling comprises a sleeping product having varying areas of firmness.

15. The method of claim 13 wherein said means for leveling comprises a sleeping product having varying areas of thickness.

16. The method of claim 1 wherein said dimensional coordinate measuring system comprises a three dimensional coordinate measuring system comprising:

a movable arm having opposed first and second ends, said arm including a plurality of joints with each joint corresponding to a degree of freedom, each of said joints including a rotational transfer housing for housing position transducer means, said transducer means producing a position signal;

a support base attached to said first end of said movable arm;

said probe attached to said second end of said movable arm; and means for receiving said position signals from said transducer means and providing a digital coordinate corresponding to the position of said probe.

17. The method of claim 1 wherein said probe includes:

a pair of first and second switches, said first switch corresponding to data "take" and said second switch corresponding to data "acceptance".

* * * * *